(12) United States Patent
Zang et al.

(10) Patent No.: US 11,480,996 B2
(45) Date of Patent: Oct. 25, 2022

(54) WEARABLE DISPLAY APPARATUS AND DISPLAY CONTROL METHOD THEREOF

(71) Applicants: Chengdu BOE Optoelectronics Technology Co., Ltd., Sichuan (CN); BOE Technology Group Co., Ltd., Beijing (CN)

(72) Inventors: Pengcheng Zang, Beijing (CN); Yuanjie Xu, Beijing (CN)

(73) Assignees: CHENGDU BOE OPTOELECTRONICS TECHNOLOGY CO., LTD., Sichuan (CN); BEIJING BOE TECHNOLOGY DEVELOPMENT CO., LTD., Beijing (CN)

( * ) Notice: Subject to any disclaimer, the term of this patent is extended or adjusted under 35 U.S.C. 154(b) by 197 days.

(21) Appl. No.: 17/043,940

(22) PCT Filed: Jan. 20, 2020

(86) PCT No.: PCT/CN2020/073170
§ 371 (c)(1),
(2) Date: Sep. 30, 2020

(87) PCT Pub. No.: WO2020/151645
PCT Pub. Date: Jul. 30, 2020

(65) Prior Publication Data
US 2021/0026402 A1 Jan. 28, 2021

(30) Foreign Application Priority Data
Jan. 24, 2019 (CN) .......................... 201910068867.3

(51) Int. Cl.
*G06F 1/16* (2006.01)
*G06F 3/16* (2006.01)
(Continued)

(52) U.S. Cl.
CPC ............ *G06F 1/163* (2013.01); *G06F 1/1605* (2013.01); *G06F 1/1652* (2013.01); *G06F 3/16* (2013.01); *G10K 9/122* (2013.01); *H01Q 1/2266* (2013.01)

(58) Field of Classification Search
CPC ........ G06F 1/1652; G06F 1/163; G06F 3/043; G06F 3/0436; G09G 2380/02
See application file for complete search history.

(56) References Cited

U.S. PATENT DOCUMENTS

2014/0152553 A1 6/2014 Cha et al.
2017/0031518 A1* 2/2017 An .......................... G06F 3/041

FOREIGN PATENT DOCUMENTS

| CN | 1306386 C | 3/2007 |
|----|-----------|--------|
| CN | 104848798 A | 8/2015 |

(Continued)

OTHER PUBLICATIONS

First Office Action dated Mar. 11, 2020 for corresponding Chinese application No. 201910068867.3.

*Primary Examiner* — Priyank J Shah
(74) *Attorney, Agent, or Firm* — Nath, Goldberg & Meyer; Joshua B. Goldberg

(57) ABSTRACT

A wearable display apparatus is provided. The wearable display apparatus includes: a substrate having first and second surfaces; a display component on the first surface; a surface acoustic wave transmission layer on the second surface; a surface acoustic wave input transducer configured to send out a first surface acoustic wave; a surface acoustic wave output transducer on the surface acoustic wave transmission layer, each surface acoustic wave output transducer and a corresponding surface acoustic wave input transducer being at an edge of the substrate to be adjacent to and spaced apart from each other, and each surface acoustic wave output transducer being configured to receive a second surface (Continued)

acoustic wave resulted from the first surface acoustic wave being transmitted and modulated by the surface acoustic wave transmission layer; and a control device, configured to control a target area of the display component to display.

20 Claims, 4 Drawing Sheets

(51) Int. Cl.
  *G10K 9/122* (2006.01)
  *H01Q 1/22* (2006.01)

(56) References Cited

FOREIGN PATENT DOCUMENTS

| | | |
|---|---|---|
| CN | 105373364 A | 3/2016 |
| CN | 105892127 A | 8/2016 |
| CN | 106611592 A | 5/2017 |
| CN | 107357470 A | 11/2017 |
| CN | 107430427 A | 12/2017 |
| CN | 107980158 A | 5/2018 |
| CN | 108228046 A | 6/2018 |
| CN | 108492787 A | 9/2018 |
| CN | 108536382 A | 9/2018 |
| CN | 109584777 A | 4/2019 |
| EP | 0385706 A2 | 9/1990 |
| KR | 20170047057 A | 5/2017 |

\* cited by examiner

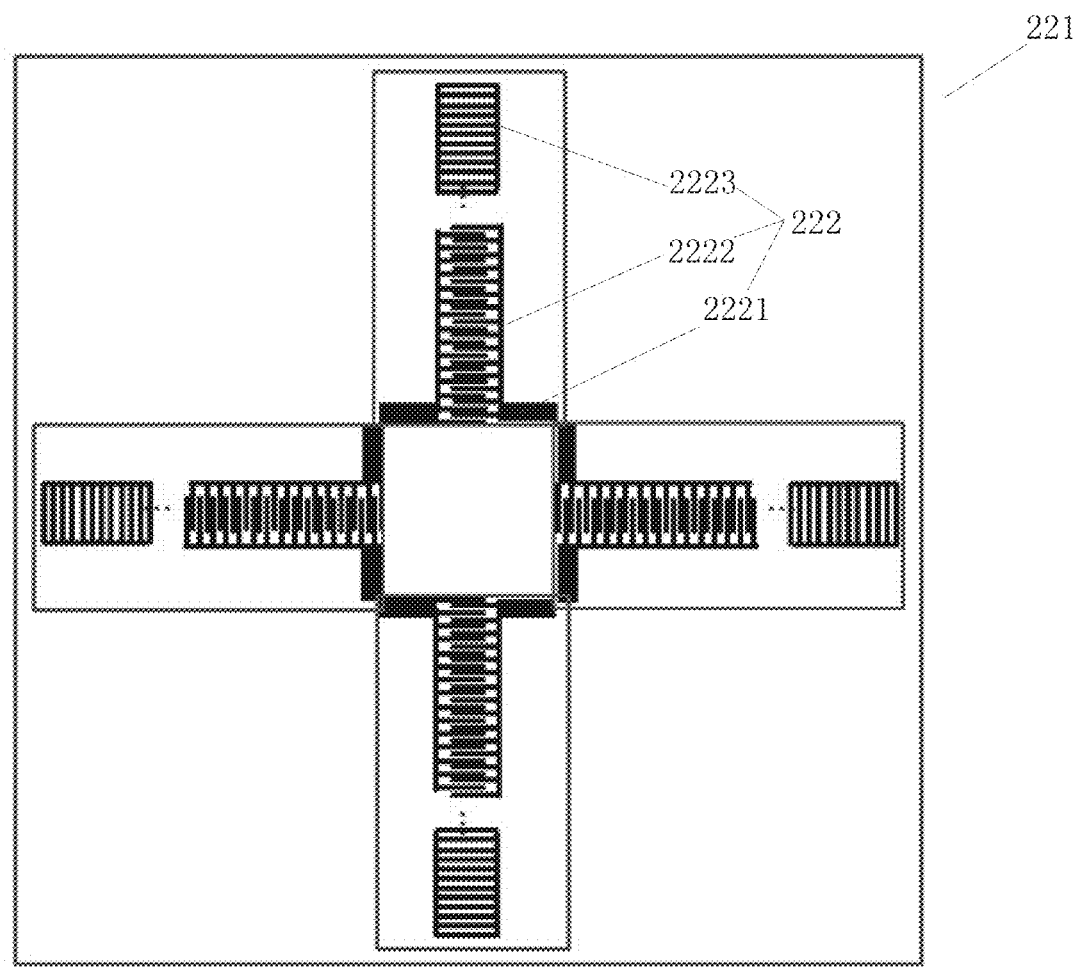

FIG. 4

| Sending a first electric signal, by a control device, to at least one surface acoustic wave input transducer to control the at least one surface acoustic wave input transducer to send out a first surface acoustic wave |
|---|

— 201

| Receiving a second electrical signal, by the control device, from at least one surface acoustic wave output transducer |
|---|

— 202

| Processing the first electric signal and the second electric signal, by the control device, to obtain a target area of a display component suitable for display, and controlling the target area, by the control device, to display |
|---|

WEARABLE DISPLAY APPARATUS AND DISPLAY CONTROL METHOD THEREOF

CROSS REFERENCE TO RELATED APPLICATIONS

This is a National Phase Application filed under 35 U.S.C. 371 as a national stage of PCT/CN2020/073170, filed Jan. 20, 2020, an application claiming the benefit of Chinese patent application No. 201910068867.3, filed on Jan. 24, 2019, the entire contents of each of which are incorporated herein by reference in their entirety.

TECHNICAL FIELD

The present disclosure relates to the field of electronic apparatuses, and in particular, to a wearable display apparatus and a display control method of a wearable display apparatus.

BACKGROUND

With the development of electronic technology and smart technology, more and more wearable display apparatuses are appearing in people's lives.

In the related art, wearable display apparatuses are mainly represented by smart bracelets, and the smart bracelets mainly be classified as two types: one is a combination of a display panel and a wristband, and the other is a ring-shaped display panel. The ring-shaped display panel may display more information, provide better user experiences, and thus becomes more popular and the future development trend.

SUMMARY

Embodiments of the present disclosure provide a wearable display apparatus and a display control method thereof.

An aspect of the present disclosure provides a wearable display apparatus, including:
 a substrate;
 a display component on a first surface of the substrate;
 a surface acoustic wave transmission layer on a second surface of the substrate opposite to the first surface;
 at least one surface acoustic wave input transducer on the surface acoustic wave transmission layer and along a first direction, at an edge of the substrate, and configured to send out a first surface acoustic wave;
 at least one surface acoustic wave output transducer on the surface acoustic wave transmission layer and along a second direction crossing the first direction, the at least one surface acoustic wave output transducer being in one-to-one correspondence with the at least one surface acoustic wave input transducer, each surface acoustic wave output transducer and a corresponding surface acoustic wave input transducer being at an edge of the substrate to be adjacent to and spaced apart from each other, and each surface acoustic wave output transducer being configured to receive a second surface acoustic wave resulted from the first surface acoustic wave being transmitted and modulated by the surface acoustic wave transmission layer; and
 a control device, configured to send a first electric signal to the at least one surface acoustic wave input transducer to control the at least one surface acoustic wave input transducer to send out the first surface acoustic wave, and configured to receive a second electric signal output from the at least one surface acoustic wave output transducer, and control a target area of the display component to display based on the first electric signal and the second electric signal.

In an embodiment, the surface acoustic wave transmission layer includes a piezoelectric film and a surface acoustic wave transmission device layer that are sequentially stacked on the second surface of the substrate; and
 both the at least one surface acoustic wave input transducer and the at least one surface acoustic wave output transducer are on the piezoelectric film.

In an embodiment, the surface acoustic wave transmission device layer includes a plurality of surface acoustic wave transmission devices that are spaced apart from each other and distributed on the piezoelectric film in a matrix; and
 the plurality of surface acoustic wave transmission devices are configured to transmit surface acoustic waves with different wavelengths.

In an embodiment, each of the plurality of surface acoustic wave transmission devices includes a plurality of interdigital transduction transmission subunits, each of the plurality of interdigital transduction transmission subunits includes two antennas, one interdigital transducer and one reflective grating, the two antennas are connected to two sides of a first end of the interdigital transducer, respectively, and the reflective grating is at a second end of the interdigital transducer opposite to the first end and is spaced apart from the second end; and
 the plurality of interdigital transduction transmission subunits are around a same position, and the antennas at first ends of interdigital transducers are sequentially connected to each other to form a polygon.

In an embodiment, the reflecting grating of each interdigital transduction transmission subunit of the plurality of interdigital transduction transmission subunits is an encoded reflective grating, the encoded reflective grating has a code indicating a physical position of the encoded reflective grating on the surface acoustic wave transmission layer, and the surface acoustic wave transmitted by the interdigital transduction transmission subunit includes the code.

In an embodiment, the plurality of surface acoustic wave transmission devices include surface acoustic wave transmission devices having a function of a pressure sensor and surface acoustic wave transmission devices having a function of a temperature sensor, the surface acoustic wave transmission devices having a function of a pressure sensor form a first sub-matrix, and the surface acoustic wave transmission devices having a function of a temperature sensor form a second sub-matrix.

In an embodiment, each surface acoustic wave transmission device having a function of a pressure sensor includes a pressure sensitive material layer between the plurality of interdigital transduction transmission subunits of the surface acoustic wave transmission device having a function of a pressure sensor and the piezoelectric film, and each surface acoustic wave transmission device having a function of a temperature sensor includes a temperature sensitive material layer between the plurality of interdigital transduction transmission subunits of the surface acoustic wave transmission device having a function of a temperature sensor and the piezoelectric film.

In an embodiment, each surface acoustic wave transmission device having a function of a pressure sensor includes a pressure sensor in the polygon formed by the antennas of the plurality of interdigital transduction transmission subunits of the surface acoustic wave transmission device having a function of a pressure sensor, and each surface acoustic wave transmission device having a function of a temperature sensor includes a temperature sensor in the polygon formed by the antennas of the plurality of interdigital transduction transmission subunits of the surface acoustic wave transmission device having a function of a temperature sensor.

In an embodiment, columns of the first sub-matrix and columns of the second sub-matrix are arranged alternately.

In an embodiment, rows of the first sub-matrix and rows of the second sub-matrix are arranged alternately.

In an embodiment, a length of each interdigital transducer is equal to 10 times of a wavelength of the surface acoustic wave transmitted by the interdigital transducer;

a distance between any two adjacent fingers of the interdigital transducer is equal to ½ of the wavelength of the surface acoustic wave transmitted by the interdigital transducer;

a width of each finger of the interdigital transducer is equal to ¼ of the wavelength of the surface acoustic wave transmitted by the interdigital transducer; and an interdigital aperture of the interdigital transducer is 2 mm to 4 mm.

In an embodiment, the at least one surface acoustic wave input transducer includes a plurality of surface acoustic wave input transducers, which are substantially uniformly distributed on a periphery of the substrate; and the at least one surface acoustic wave output transducer includes a plurality of surface acoustic wave output transducers, which are on the periphery of substrate to be respectively adjacent to and spaced apart from the plurality of surface acoustic wave input transducers.

In an embodiment, the substrate is a rectangle;

the plurality of surface acoustic wave input transducers include four surface acoustic wave input transducers, which are at four corners of the substrate, respectively; and the plurality of surface acoustic wave output transducers include four surface acoustic wave output transducers, which are at the four corners of the substrate to be adjacent to and spaced apart from the plurality of surface acoustic wave input transducers, respectively.

In an embodiment, the substrate is a flexible substrate, and the display component is a flexible display component.

Another aspect of the present disclosure provides a display control method of a wearable display apparatus, the wearable display apparatus being the wearable display apparatus according to any one of the foregoing embodiments of the present disclosure, the display control method including:

sending the first electric signal, by the control device, to the at least one surface acoustic wave input transducer to control the at least one surface acoustic wave input transducer to send out the first surface acoustic wave;

receiving the second electric signal, by the control device, from the at least one surface acoustic wave output transducer; and processing the first electric signal and the second electric signal by the control device to obtain a target area of the display component suitable for display, and controlling the target area, by the control device, to perform a display function;

wherein the second electric signal is converted from the second surface acoustic wave by the at least one surface acoustic wave output transducer, and the second surface acoustic wave is resulted from the first surface acoustic wave being transmitted and modulated by the surface acoustic wave transmission layer.

In an embodiment, the control device obtains a frequency of the first surface acoustic wave based on the first electric signal, obtains a frequency of the second surface acoustic wave based on the second electric signal, and obtains an initial bent state of the wearable display apparatus based on the frequency of the first surface acoustic wave and the frequency of the second surface acoustic wave.

In an embodiment, the at least one surface acoustic wave input transducer includes a plurality of surface acoustic wave input transducers, and the at least one surface acoustic wave output transducer includes a plurality of surface acoustic wave output transducers;

the first electric signal is configured to control the plurality of surface acoustic wave input transducers to send out first surface acoustic waves with a same frequency and different wavelengths; and second electric signals are converted from second surface acoustic waves having different wavelengths, respectively.

In an embodiment, processing the first electric signal and the second electric signal by the control device to obtain a target area of the display component suitable for display includes:

obtaining, by the control device, a wavelength of the first surface acoustic wave based on the first electric signal, and obtaining, by the control device, a wavelength of the second surface acoustic wave based on the second electric signal, so as to obtain a wavelength distribution, obtaining, by the control device, a distribution of pressures applied to the surface acoustic wave transmission layer, and obtaining, by the control device, the target area of the display component suitable for display according to the wavelength distribution and the distribution of pressures.

In an embodiment, the distribution of pressures includes a uniform distribution and a non-uniform distribution;

the control device controls the display component to display or not display in its entirety in a case of the uniform distribution; and the control device controls the target area of the display component to perform a display function in a case of the non-uniform distribution.

In an embodiment, the processing the first electric signal and the second electric signal by the control device to obtain a target area of the display component suitable for display includes:

obtaining, by the control device, a wavelength of the first surface acoustic wave based on the first electric signal, and obtaining, by the control device, a wavelength of the second surface acoustic wave based on the second electric signal, so as to obtain a wavelength distribution, obtaining, by the control device, a distribution of temperatures of the surface acoustic wave transmission layer, and obtaining, by the control device, the target area of the display component suitable for display according to the wavelength distribution and the distribution of temperatures.

The foregoing is only a general description of the technical solutions of the present disclosure. To enable the technical means of the present disclosure to be understood more clearly and to be implemented in accordance with the content of the specification, detailed description will be made below in exemplary embodiments of the present disclosure in conjunction with the accompanying drawings.

BRIEF DESCRIPTION OF THE DRAWINGS

FIG. 4 is a schematic view showing a structure of a surface acoustic wave transmission device according to an embodiment of the present disclosure;

FIG. 5 is a schematic flowchart of a display control method of a wearable display apparatus according to an embodiment of the present disclosure;

DETAILED DESCRIPTION

To further explain technical solutions of the present disclosure, a wearable display apparatus and a display control method thereof according to the present disclosure, their specific implementations, structures, features and advantageous technical effects will be described below in detail with reference to the accompanying drawings and exemplary embodiments. In the following description, the expressions "an embodiment" or "the present embodiment" does not necessarily refer to a same embodiment. Further, certain features, structures, or characteristics in one or more embodiments may be combined with each other in any suitable manner.

The inventors of the present inventive concept have found that, the entire display area of the ring-shaped display panel in the related art is in a display state, regardless of a manner in which the ring-shaped display panel is worn by a user and a usage state. However, in a particular wearing manner or usage state, the user may usually only see a part of the entire display area of the ring-shaped display panel. In this case, the entire display area of the ring-shaped display panel being in the display state will result in that only a part of the displayed information is visible to the user. In addition, portions of the entire display area of the ring-shaped display panel that are not visible to the user are also lit to display, which may result in unnecessary power consumption.

Figure 1:
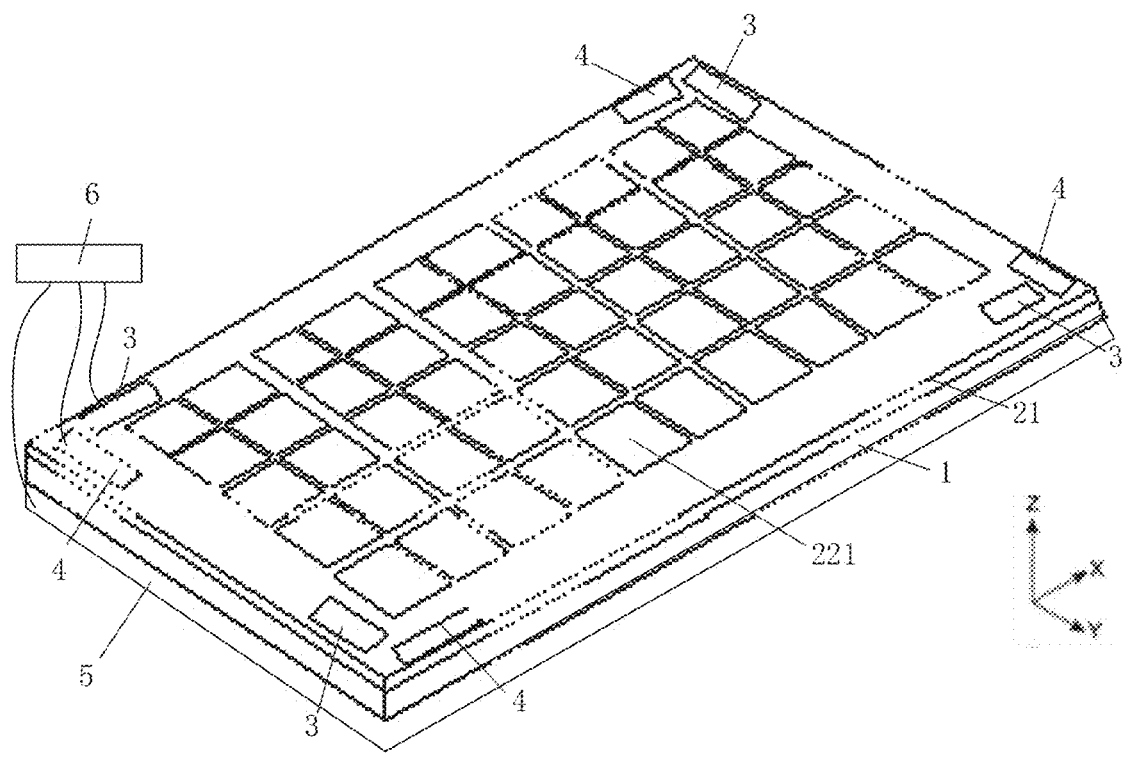
FIG. 1 is a schematic diagram showing a structure of a wearable display apparatus according to an embodiment of the present disclosure.
Figure 2:
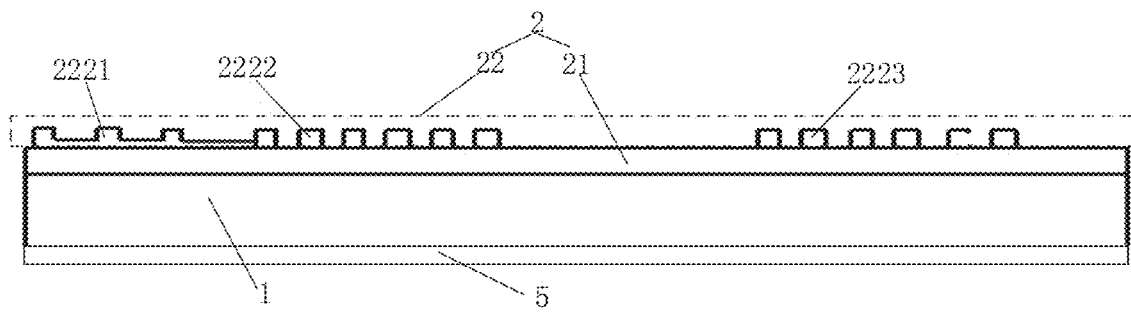
FIG. 2 is a schematic diagram showing a structure of a wearable display apparatus observed from another perspective, according to an embodiment of the present disclosure.

As shown in FIG. 1, an embodiment of the present disclosure provides a wearable display apparatus, which includes: a substrate 1, a display component (e.g., a liquid crystal display panel, an organic light emitting diode display panel, etc.) 5, a surface acoustic wave transmission layer 2, at least one surface acoustic wave input transducer 3, at least one surface acoustic wave output transducer 4, and a control device 6. The display component 5 is provided on a first surface (e.g., a lower surface as shown in FIGS. 1 and 2) of the substrate 1, and the surface acoustic wave transmission layer 2 is provided on a second surface (e.g., an upper surface as shown in FIGS. 1 and 2) of the substrate 1 opposite to the first surface on which the display component 5 is provided. The at least one surface acoustic wave input transducer 3 is provided on the surface acoustic wave transmission layer 2 along a first direction (e.g., an X direction shown in FIG. 1) and at an edge of the substrate 1, and may output a first surface acoustic wave. The at least one surface acoustic wave output transducer 4 is provided on the surface acoustic wave transmission layer 2 along a second direction (e.g., the Y direction shown in FIG. 1) crossing (or intersecting) with (e.g., perpendicular to) the first direction, and may be in one-to-one correspondence with the at least one surface acoustic wave input transducer 3. Each of the at least one surface acoustic wave output transducer 4 and its corresponding surface acoustic wave input transducer 3 are adjacent to each other and are provided at an edge of the substrate 1 with an interval therebetween. Each of the at least one surface acoustic wave output transducer 4 may receive a second surface acoustic wave resulted from the first surface acoustic wave being transmitted and modulated by the surface acoustic wave transmission layer 2, and output a second electric signal. The control device 6 is connected to the display component 5, each of the at least one surface acoustic wave input transducer 3 and each of the at least one surface acoustic wave output transducer 4, respectively (It should be noted that, for ease of illustration, FIG. 1 only shows that the control device 6 is connected to the display component 5, one surface acoustic wave input transducer 3 and one surface acoustic wave output transducer 4, respectively), may send a first electric signal to each of the at least one surface acoustic wave input transducer 3 to control the at least one surface acoustic wave input transducer 3 to output the first surface acoustic wave, may receive the second electric signal output from the at least one surface acoustic wave output transducer 4, and may control a target area of the display component 5 to display based on the first electric signal and the second electric signal. For example, the control device 6 may be provided on the substrate 1, or may be provided on the surface acoustic wave transmission layer 2 (e.g., on a piezoelectric film 21 of the surface acoustic wave transmission layer 2). Each of the at least one surface acoustic wave input transducer 3 or each of the at least one surface acoustic wave output transducer 4 may be a known interdigital transducer (IDT).

Figure 6:
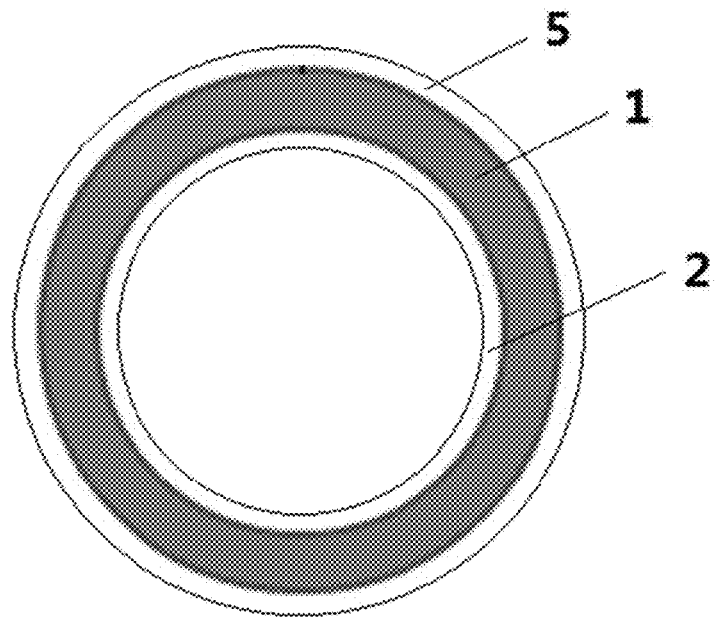
FIG. 6 is a schematic diagram showing a bent state of a wearable display apparatus according to an embodiment of the present disclosure.

For example, the wearable display apparatus according to the embodiment of the present disclosure may have a bendable function, a wearable function, a smart (or intelligent) function, and the like. The bendable function of the wearable display apparatus may be realized as follows: the substrate 1 includes a plurality of divided bodies rotatably connected to each other by a hinge, a gear, a rotating shaft, or the like, the display component includes a plurality of display components corresponding to (e.g., in one-to-one correspondence with) the plurality of divided bodies of the substrate 1, and each of the plurality of display components is provided on the corresponding divided body of the substrate 1. Alternatively, the bendable function of the wearable display apparatus is achieved by cooperation of a flexible substrate 1 and a flexible display component (e.g., a flexible organic light emitting diode display panel). The wearable function may be achieved by bending of the wearable display apparatus (e.g., the wearable display apparatus may be bent into a ring shape as shown in FIG. 6, in this case the surface acoustic wave transmission layer 2 is located at the inside of the ring shape and the display component 5 is located at the outside of the ring shape), or by providing a wearing component (e.g., a ring belt). The smart function may be implemented by an intelligent control device (e.g., the control device 6) provided in the wearable display apparatus.

As shown in FIG. 1 and FIG. 2, the substrate 1 of the wearable display apparatus according to an embodiment of the present disclosure may be configured as a rigid substrate or a flexible substrate according to specific design and usage requirements, and the present disclosure does not limit conventional parameters such as a material for manufacturing the substrate 1 and a shape of the substrate 1. The display component 5 of the wearable display apparatus according to an embodiment of the present disclosure may be any display panel having a display function, such as a liquid crystal display (LCD) panel or an organic light emitting diode (OLED) display panel. The display component 5 may be rigid or flexible and, may be selected according to a practical application.

As shown in FIGS. 1 and 2, the surface acoustic wave transmission layer 2 of the wearable display apparatus according to an embodiment of the present disclosure may be provided on a second surface of the substrate 1, for example, may be provided on the entire surface of the second surface of the substrate 1. The surface acoustic wave transmission layer 2 may be bent in the same way as the deformation of the substrate 1 (i.e., the bend of the wearable display apparatus). The surface acoustic wave transmission layer 2 is a structural layer for transmitting a surface acoustic wave, and may also be a structural layer capable of modulating the surface acoustic wave. For example, when the surface acoustic wave transmission layer 2 is bent and thus deformed, a modulation effect may be produced for a surface acoustic wave transmitted through the structural layer. Therefore, the first surface acoustic wave output from each of the at least one surface acoustic wave input transducer 3 may be changed in frequency and in wavelength by the surface acoustic wave transmission layer 2, and then become the second surface acoustic wave.

As shown in FIGS. 1 and 2, each surface acoustic wave input transducer 3 of the wearable display apparatus according to an embodiment of the present disclosure may output surface acoustic waves of different wavelengths. For example, each surface acoustic wave input transducer 3 may receive first electric signals sent from the control device 6 and convert the first electric signals into surface acoustic waves, and may convert the first electric signals into first surface acoustic waves of different wavelengths according to different information included in the first electric signals. Each surface acoustic wave input transducer 3 is provided on the surface acoustic wave transmission layer 2 (e.g., on a piezoelectric film 21 of the surface acoustic wave transmission layer 2) such that an output first surface acoustic wave may be transmitted along the surface acoustic wave transmission layer 2 on a surface of the substrate 1. Each surface acoustic wave input transducer 3 may be provided at an edge of the substrate 1, such that a first surface acoustic wave output from the surface acoustic wave input transducer 3 may be transmitted to another edge (e.g., an adjacent edge) of substrate 1 through the surface acoustic wave transmission layer 2, and the first surface acoustic wave may pass through a bent or deformed region of the wearable display apparatus, to become the second surface acoustic wave after the frequency and the wavelength of the first surface acoustic wave have been changed under the modulation effect of the surface acoustic wave transmission layer 2 in a bent state. Each surface acoustic wave input transducer 3 used in an embodiment of the present disclosure may be directly purchased from the market (i.e., may be a known surface acoustic wave input transducer) according to a practical application.

As shown in FIGS. 1 and 2, each surface acoustic wave output transducer 4 of the wearable display apparatus according to an embodiment of the present disclosure may receive the second surface acoustic wave, convert the second surface acoustic wave into a second electric signal including information about the frequency and the wavelength of the second surface acoustic wave, and transmit the second electric signal to the control device 6. Each surface acoustic wave output transducer 4 may be provided on the surface acoustic wave transmission layer 2 (e.g., on the piezoelectric film 21 of the surface acoustic wave transmission layer 2) to be able to receive a surface acoustic wave transmitted by the surface acoustic wave transmission layer 2 on a surface of the substrate 1, and may be provided adjacent to and have an interval with a corresponding surface acoustic wave input transducer 3, i.e., may also be provided at an edge of the substrate 1. As such, a surface acoustic wave output from one side of the substrate 1 of the wearable display apparatus may be received at another side (e.g., an adjacent side), thereby forming a closed loop structure for transmission and reception. Similarly, each surface acoustic wave output transducer 4 may be directly purchased from the market (i.e., may be a known surface acoustic wave output transducer) according to a practical application.

As shown in FIGS. 1 and 2, the control device of the wearable display apparatus according to an embodiment of the present disclosure may be a main processor (e.g., a central processing unit (CPU), an application processor (AP), etc.) of the wearable display apparatus or a secondary processor (e.g., an application-specific integrated circuit different from the CPU or the AP) dedicated to control of display. The control device 6 may process the first electric signal and the second electric signal to obtain difference(s) between a frequency (and/or a wavelength) of the first electric signal and a frequency (and/or a wavelength) of the second electric signal, obtain a distribution of pressures applied to the surface acoustic wave transmission layer 2 on a surface of the substrate 1, obtain a distribution of temperatures of the surface acoustic wave transmission layer 2 on the surface of the substrate 1, and obtain a target area, which is a portion of the entire display area suitable for display, of the display component of the wearable display apparatus, according to the difference(s) between the frequencies (and/or the wavelengths), the distribution of pressures, and the distribution of temperatures, so as to control the target area to display. For example, a method for obtaining the difference(s) between the frequencies (and/or the wavelengths), the distribution of pressures and the distribution of temperatures according to the first electric signal and the second electric signal may be referred to the description below, or may be a method known to one of ordinary skill in the art.

As shown in FIGS. 1 and 2, in the wearable display apparatus according to the embodiments of the present disclosure, the display component is provided on the first surface of the substrate 1, the surface acoustic wave transmission layer 2 is provided on the second surface opposite to the first surface on which the display component is provided, and a surface acoustic wave input transducer 3 and a surface acoustic wave output transducer 4 are provided on the surface acoustic wave transmission layer 2 and near an edge of the substrate 1 to be adjacent to each other and spaced apart from each other. As such, the wearable display apparatus may cause each surface acoustic wave input transducer 3 to output (or send out) a first surface acoustic wave under the control of a first electric signal sent from the control device, the first surface acoustic wave may be transmitted in the surface acoustic wave transmission layer 2, a frequency and a wavelength of the first surface acoustic wave may be changed according to a bent state of the surface acoustic wave transmission layer 2 (i.e., a bent state of the wearable display apparatus) and a pressure distribution and a temperature distribution of surface acoustic wave transmission layer 2, and then the first surface acoustic wave becomes the second surface acoustic wave. Next, the second surface acoustic wave is received by a surface acoustic wave output transducer 4, and a second electric signal is input to the control device 6 from the surface acoustic wave output transducer 4. At this time, the control device 6 may obtain the bent state of the wearable display apparatus, determine a target area suitable for display of the display component 5 of the wearable display apparatus, and drive the target area to display, based on the first electric signal and the second electric signal. In summary, the wearable display apparatus according to the embodiments of the present disclosure may determine a bent state thereof, determine a target area (e.g., a part or all of the entire display area capable of displaying information) suitable for displaying of the display component 5, and drive the target area to display, thereby preventing the portion of the display area inconvenient for a user to view (e.g., the portion of the entire display area capable of displaying information that cannot be viewed by the user) from displaying, and reducing the power consumption while facilitating the user to view the display area.

As shown in FIGS. 1 and 2, in a specific implementation, since a surface acoustic wave may be transmitted on a surface of a piezoelectric film while being modulated by a surface acoustic wave transmission device (e.g., a surface acoustic wave transmission device 221 to be described below), the surface acoustic wave transmission layer 2 may include a piezoelectric film 21 and a surface acoustic wave transmission device layer 22, which are sequentially stacked on the second surface of the substrate 1. In this case, the at least one surface acoustic wave input transducer 3 and the at least one surface acoustic wave output transducer 4 may be provided on the piezoelectric film 21.

For example, the piezoelectric film 21 may be formed on the substrate 1 by coating, deposition, evaporation, or the like, and a material of the piezoelectric film 21 may be at least one of polyvinylidene fluoride (PVDF), zinc oxide (ZnO), and aluminum nitride (AlN). For example, a surface acoustic velocity of the piezoelectric film 21 made of PVDF may be 2000 m/s, characteristic frequencies of surface acoustic waves to be transmitted may be selected from 125 KHz, 13.56 MHz, and 433 MHz, and the minimum thicknesses (i.e., sizes in a direction perpendicular to the first surface or the second surface of the substrate 1) of the piezoelectric film 21 corresponding to the characteristic frequencies may be 16 mm, 147 µm, and 5 µm, respectively. A surface acoustic velocity of the piezoelectric film 21 made of ZnO may be 2650 m/s, characteristic frequencies of surface acoustic waves to be transmitted may be selected from 125 KHz, 13.56 MHz and 433 MHz, and the minimum thicknesses of the piezoelectric film 21 corresponding to the characteristic frequencies may be 21 mm, 195 µm, and 6 µm, respectively. A surface acoustic velocity of the piezoelectric film 21 made of AlN may be 5607 m/s, characteristic frequencies of surface acoustic waves to be transmitted may be selected from 125 KHz, 13.56 MHz, and 433 MHz, and the minimum thicknesses of the piezoelectric film 21 corresponding to the characteristic frequencies may be 45 mm, 413 µm, and 13 µm, respectively.

Figure 3:
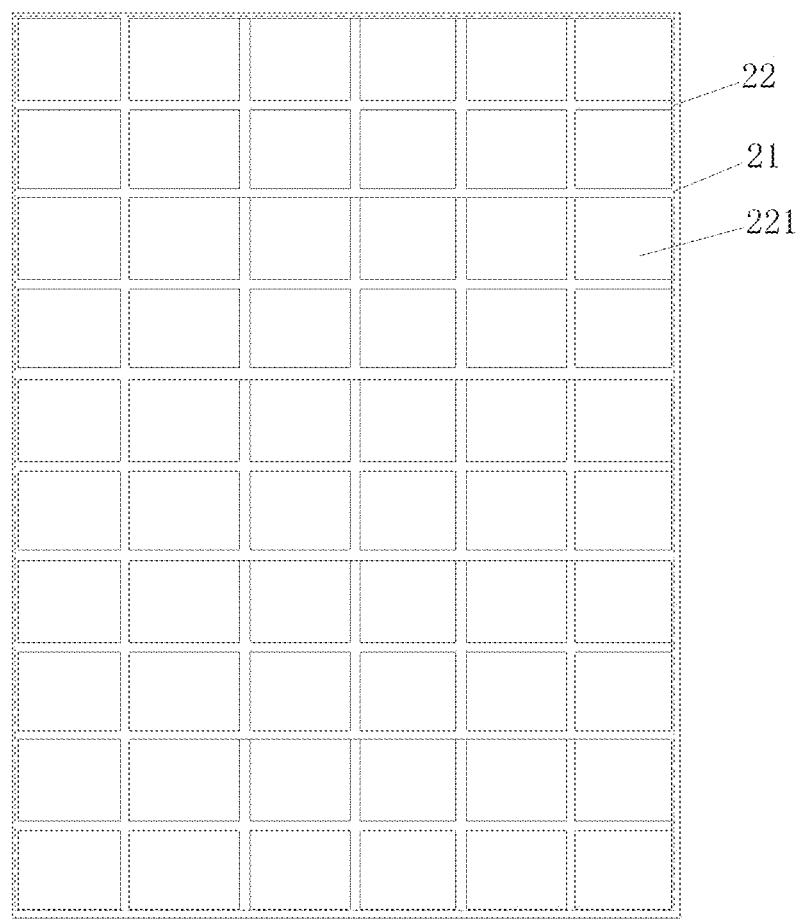
FIG. 3 is a schematic diagram showing a structure of a surface acoustic wave transmission layer of a wearable display apparatus according to an embodiment of the present disclosure.

As shown in FIGS. 1 to 3, further, the surface acoustic wave transmission device layer 22 may be a layer including devices for transmitting and modulating a surface acoustic wave. The surface acoustic wave transmission device layer 22 may include a plurality of surface acoustic wave transmission devices 221, and the plurality of surface acoustic wave transmission devices 221 are spaced apart from each other and arranged in a matrix (or array) on the piezoelectric film 21. For example, the plurality of surface acoustic wave transmission devices 221 may receive and transmit surface acoustic waves with different wavelengths.

For example, each surface acoustic wave transmission device 221 may be a device capable of individually performing reception and modulation of a surface acoustic wave. The plurality of surface acoustic wave transmission devices 221 are arranged on the piezoelectric film 21 in the matrix and with an interval therebetween, such that a surface acoustic wave transmitted on the piezoelectric film 21 in any direction may be received and modulated by at least one surface acoustic wave transmission device 221. Further, the surface acoustic wave transmission devices 221 may transmit surface acoustic waves with different wavelengths. In this way, no matter when a surface acoustic wave with any wavelength is transmitted on the piezoelectric film 21, the surface acoustic wave may be received and modulated by a corresponding surface acoustic wave transmission device 221. For example, a wavelength band resulted from the combination of the wavelengths of the plurality of surface acoustic wave transmission devices 221 may be an operating wavelength band of the wearable display apparatus.

In a specific implementation, as shown in FIG. 4, each of the surface acoustic wave transmission devices 221 may include a plurality of (e.g., 4 as shown in FIG. 4) interdigital transduction transmission subunits 222, and each of the interdigital transduction transmission subunits 222 may include two antennas 2221, one interdigital transducer 2222, and one reflective grating 2223. The two antennas 2221 are connected to both sides of a first end (e.g., an end proximal to the center position in FIG. 4) of the interdigital transducer 2222, respectively, and the reflective grating 2223 is provided at a second end of the interdigital transducer 2222 opposite to the first end. The plurality of interdigital transduction transmission subunits 222 may be provided around a same position (e.g., the center position in FIG. 4), and the antennas 2221 at the first ends of the plurality of interdigital transducers 2222 are sequentially connected to each other ringwise to form a polygon (e.g., a quadrilateral (e.g., a square) as shown in FIG. 4).

For example, each of the interdigital transducers 2222 may be a metal pattern formed on the surface of the piezoelectric film 21 in a shape like that fingers of two hands intersect each other, and may achieve conversion between acoustic energy and electric energy (i.e., conversion between an acoustic signal and an electric signal). The two antennas 2221 of each interdigital transducer 2222 may be devices for receiving a surface acoustic wave and transmitting the surface acoustic wave, respectively. The reflective grating 2223 may be an encoded reflective grating 2223 (e.g., the reflective grating 2223 encoded in the form of 010101 . . . ) and may be a device that, in conjunction with a corresponding interdigital transducer 2222, modulates a surface acoustic wave received by a corresponding antenna 2221. In order to realize reception, modulation, and transmission of a surface acoustic wave, the plurality of interdigital transducers 2222 may be provided in each surface acoustic wave transmission device 221, and the plurality of interdigital transducers 2222 may be arranged annularly such that the antennas 2221 at the first ends of the plurality of interdigital transducers 2222 sequentially surround the same position to form a polygon (e.g., a rectangle or a square). In this way, a surface acoustic wave transmitted on the piezoelectric film 21 in any direction may be received and modulated by at least one interdigital transduction transmission subunit 222 in at least one surface acoustic wave transmission device 221, then may be sent out from a corresponding antenna 2221, and then may enter into the piezoelectric film 21 again for further transmission, or in turn the surface acoustic wave is transmitted in an adjacent surface acoustic wave transmission device 221 for further transmission. If the wearable display apparatus is bent and deformed, the piezoelectric film 21 and the surface acoustic wave transmission devices 221 are deformed accordingly, such that a frequency and a wavelength of the surface acoustic wave passing through the deformed surface acoustic wave transmission devices 221 will be changed correspondingly. Thus, the first surface acoustic wave, after its frequency and wavelength are changed, becomes the second surface acoustic wave. Then, the second surface acoustic wave may be converted by at least one surface acoustic wave output transducer 4 into the second electric signal, and the second electric signal includes information of the frequency and the wavelength of the second surface acoustic wave. After receiving the second electric signal, the control device may compare and analyze a frequency difference or a wavelength difference between the first electric signal and the second electric signal, determine a bent state of the surface acoustic wave transmission layer 2, and may know a bent state of the wearable display apparatus. In addition, if the pressure or the temperature of the wearable display apparatus changes, i.e., if the pressure applied to the surface acoustic wave transmission layer 2 or the temperature of the surface acoustic wave transmission layer 2 is changed, a wavelength of the surface acoustic wave passing through the position where the pressure is changed and/or the temperature is changed will be changed correspondingly. Thus, the wavelength and the frequency of the first surface acoustic wave are changed correspondingly to generate the second surface acoustic wave, such that after the second surface acoustic wave is converted into the second electric signal, the second electric signal includes information about the changes in pressure and in temperature. Through the analysis and processing of the first electric signal and the received second electric signal by the control device 6, portions of the surface acoustic wave transmission layer 2 to which pressure is applied and in which temperature is changed may be known (or a pressure distribution and a temperature distribution of the surface acoustic wave transmission layer 2 may be known), and in combination with a bent state of the wearable display apparatus, a target area of the display component 5 suitable for display may be determined more accurately.

For example, the reflective grating 2223 and the (i.e., the corresponding) interdigital transducer 2222 of each interdigital transduction transmission subunit 222 may be provided to be spaced apart from each other, and the reflective grating 2223 of each interdigital transduction transmission subunit 222 may reflect the surface acoustic wave transmitted and modulated by the corresponding interdigital transducer 2222 back to the inside of the corresponding interdigital transducer 2222 to be sent out through the antennas 2221 located at the first end of the corresponding interdigital transducer 2222, thereby enhancing an intensity of the surface acoustic wave output by the interdigital transduction transmission subunit 222. In a case of the encoded reflective grating 2223, the reflective grating 2223 has a code indicating a physical position of reflective grating 2223 on (e.g., the surface acoustic wave transmission layer 2 of) the wearable display apparatus, and the surface acoustic wave transmitted by each interdigital transduction transmission subunit 222 includes (e.g., carries) the code indicating the physical position of reflective grating 2223 of the interdigital transduction transmission subunit 222. In this way, the control device 6 may obtain the distribution(s) of the wavelengths and/or the frequencies of the surface acoustic waves in (e.g., the surface acoustic wave transmission layer 2 of) the wearable display apparatus. Further, in a case where each surface acoustic wave transmission device 221 further includes the functions of a temperature sensor and/or a pressure sensor (which will be further described below), the control device 6 may obtain the temperature distribution and/or the pressure distribution in (e.g., the surface acoustic wave transmission layer 2 of) the wearable display apparatus. It should be understood that a main function of each reflective grating 2223 is to reflect a received surface acoustic wave back into the corresponding interdigital transducer 2222 to enhance the intensity of the surface acoustic wave output from the corresponding interdigital transduction transmission subunit 222.

In the matrix of the surface acoustic wave transmission devices 221, the surface acoustic wave transmission devices 221 in a plurality of columns may further have the functions of pressure sensors, and the surface acoustic wave transmission devices 221 in the remaining columns may have the functions of temperature sensors. The columns of surface acoustic wave transmission devices 221 having the functions of pressure sensors and the columns of surface acoustic wave transmission devices 221 having the functions of temperature sensors are arranged alternately. However, the present disclosure is not limited thereto, and for example, the surface acoustic wave transmission devices 221 having the functions of pressure sensors and the surface acoustic wave transmission devices 221 having the functions of temperature sensors may be alternately arranged in both each row and each column of the matrix.

In a case where a material layer sensitive to a physical quantity (e.g., pressure, temperature, etc.) is provided between a surface acoustic wave transmission device 221 and the piezoelectric film 21, the material layer may deform in accordance with its own temperature and/or a pressure applied to itself. A correspondence relationship between deformation and the physical quantity (e.g., pressure, temperature, etc.) may be determined in advance by experiments and stored in a memory of the control device 6. Thus, when deformation of the material layer is detected, a value of the physical quantity such as pressure, temperature, or the like may be determined by looking up in a table. In this way, the pressure distribution of (e.g., the surface acoustic wave transmission layer 2 of) the wearable display apparatus may be obtained by the surface acoustic wave transmission devices 221 having the functions of pressure sensors, and the temperature distribution of (e.g., the surface acoustic wave transmission layer 2 of) the wearable display apparatus may be obtained by the surface acoustic wave transmission devices 221 having the functions of temperature sensors. Further, the frequency distribution and/or the wavelength distribution of the surface acoustic waves of (e.g., the surface acoustic wave transmission layer 2 of) the wearable display apparatus may be obtained by the matrix of the surface acoustic wave transmission devices 221. The obtained pressure distribution, temperature distribution, frequency distribution and/or wavelength distribution may be stored in the memory of the control device 6.

Each of the surface acoustic wave devices 221 in the plurality of columns with the function of pressure sensors may include a pressure sensitive material layer (e.g., another layer of piezoelectric material different from the piezoelectric film 21, etc.) provided between the plurality of interdigital transduction transmission subunits 222 and the piezoelectric film 21, or may include a conventional pressure sensor provided in the polygon (e.g., the center portion as shown in FIG. 4) defined (or formed) by the antennas 2221 of the plurality of interdigital transduction transmission subunits 222. Each of the surface acoustic wave devices 221 in the remaining columns with the functions of temperature sensors may include a temperature sensitive material layer (e.g., a copper layer, an aluminum layer, etc.) provided between the plurality of interdigital transduction transmission subunits 222 and the piezoelectric film 21, or may include a conventional temperature sensor provided in the polygon defined by the antennas 2221 of the plurality of interdigital transduction transmission subunits 222.

The pressure distribution, temperature distribution, frequency distribution and/or wavelength distribution of the wearable display apparatus in various possible bent states may be measured in advance, and correspondence relationships between the bent states and the respective pressure distribution, temperature distribution, frequency distribution and/or wavelength distribution may be stored in the memory of the control device 6 in advance. After obtaining a pressure distribution, temperature distribution, frequency distribution and/or wavelength distribution of the wearable display apparatus in real time, the real-time distribution(s) may be compared with the pre-stored respective distributions, and the real-time (i.e., the current) bent state of the wearable display apparatus may be determined according to the pre-stored correspondence relationships, thereby obtaining a target area of the display component 2 suitable for displaying information.

Figure 7:
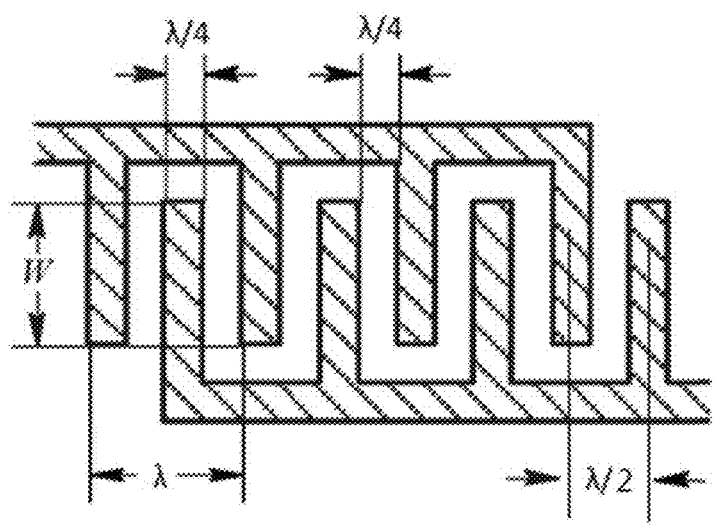
FIG. 7 is an enlarged schematic view showing a structure of one of the interdigital transducers shown in FIG. 4.

Further, FIG. 7 is an enlarged schematic view showing a structure of one of the interdigital transducers 2222 shown in FIG. 4. A length (e.g., a distance between the two outer sides of the two outermost fingers (i.e., a distance between the left side of the leftmost finger and the right side of the rightmost finger) as shown in FIG. 7) of the interdigital transducer 2222 may be equal to 10 times a wavelength $\lambda$ of the surface acoustic wave transmitted by the interdigital transducer 2222. A distance between any two adjacent fingers of the interdigital transducer 2222 (e.g., a distance between the vertical central axes of any two adjacent fingers in FIG. 7) may be equal to ½ of the wavelength $\lambda$ of the surface acoustic wave transmitted by the interdigital transducer 2222. A width of each finger (e.g., a size of each finger in the horizontal direction (or in the arrangement direction of a plurality of fingers) as shown in FIG. 7) of the interdigital transducer 2222 may be equal to ¼ of the wavelength $\lambda$ of the surface acoustic wave transmitted by the interdigital transducer 2222. And an interdigital aperture W (e.g., a size in the vertical direction of a portion where adjacent two fingers overlap each other as shown in FIG. 7) of the interdigital transducer 2222 may be 2 mm to 4 mm. The wavelength of the surface acoustic wave transmitted by the interdigital transducer 2222, i.e., the wavelength of the surface acoustic wave that the surface acoustic wave transmission device 221 can receive and transmit, may be adjusted by adjusting the width of the finger of interdigital transducer 2222.

In an embodiment, as shown in FIG. 1, the number of the surface acoustic wave input transducers 3 is two or more, and the plurality of surface acoustic wave input transducers 3 are substantially uniformly distributed on the periphery of the substrate 1. The number of the surface acoustic wave output transducers 4 is two or more. The plurality of surface acoustic wave output transducers 4 are in one-to-one correspondence with the plurality of surface acoustic wave input transducers 3, and each surface acoustic wave output transducer 4 and its corresponding surface acoustic wave input transducer 3 are arranged on the periphery of the substrate 1 to be adjacent to and spaced apart from each other.

For example, since the display component 5 of the wearable display apparatus is provided on the substrate 1 and generally has a size equal to that of the substrate 1, a shape of the display component 5 depends on a shape of the substrate 1, and a bent state of the display component 5 depends on a bent state of the substrate 1. For better detection and determination of the bent state of the substrate 1 and determination of a target area of the display component 5 suitable for display, the surface acoustic wave input transducers 3 and the surface acoustic wave output transducers 4 may be provided at the edges of substrate 1, and the plurality of surface acoustic wave input transducers 3 and the plurality of surface acoustic wave output transducers 4 may be provided.

As shown in FIG. 1, in an example, the substrate 1 is a rectangle, the number of the surface acoustic wave input transducers 3 is 4, and the surface acoustic wave input transducers 3 may be respectively arranged at four corners of the substrate 1 along a long side of the substrate 1. The number of the surface acoustic wave output transducers 4 is 4, and each surface acoustic wave output transducer 4 and its corresponding surface acoustic wave input transducers 3 may be arranged to be adjacent to and spaced apart from each other. The surface acoustic wave output transducers 4 may be respectively arranged at four corners of the substrate 1 along a short side of the substrate 1.

For example, the surface acoustic wave input transducers 3 and the surface acoustic wave output transducers 4 are provided at the four corners of the substrate 1 to be adjacent to and spaced apart from each other, as described above. For example, in the case where the substrate 1 is rectangular, a pair of the surface acoustic wave input transducer 3 and the surface acoustic wave output transducer 4 is provided at each corner of the substrate 1. For example, the surface acoustic wave input transducer 3 may be provided along a long side of the substrate 1 and the surface acoustic wave output transducer 4 may be provided along a short side adjacent to the long side of the substrate 1 (or vice versa). As such, determination of a bent state of the substrate 1 may be realized, and the number of the surface acoustic wave input transducers 3 and the number of the surface acoustic wave output transducers 4 may be effectively reduced. Thus, the cost is saved while the user experience is ensured.

As shown in FIG. 5, an embodiment of the present disclosure provides a display control method of a wearable display apparatus, and the display control method may be applied to display control of the wearable display apparatus provided by any one of the foregoing embodiments. The display control method may include the following steps 201 to 203.

In step 201, a first electric signal is sent, by control device, to at least one surface acoustic wave input transducer to control the at least one surface acoustic wave input transducer to send out a first surface acoustic wave.

For example, the control device may be a main processor or a secondary processor of the wearable display apparatus, the secondary processor being dedicated to control of display, and the first electric signal sent by the control device may be in the form of electric signals controlling the first surface acoustic waves with a same frequency and different wavelengths to be transmitted by the at least one surface acoustic wave input transducer, i.e., the first electric signal may be a series of electric signals.

In step 202, a second electric signal is received, by the control device, from at least one surface acoustic wave output transducer.

For example, the second electric signal may be obtained by converting second surface acoustic waves with different wavelengths by the at least one surface acoustic wave output transducer, and the second surface acoustic waves are obtained through transmitting and modulating the first surface acoustic waves by the surface acoustic wave transmission layer. In this way, the control device may process the second electric signal to obtain information about wavelengths and frequencies of the corresponding second surface acoustic waves.

In step 203, the first electric signal and the second electric signal are processed, by the control device, to obtain a target area of the display component suitable for display, and the target area is controlled, by the control device, to display (i.e., to perform a display function).

For example, the control device may output the first electric signal to control the at least one surface acoustic wave input transducer to send out the first surface acoustic wave with a frequency and a wavelength corresponding to those of the first electric signal, and at the same time, may obtain (or store) the frequency and the wavelength of the first surface acoustic wave corresponding to the first electric signal. Then after receiving the second electric signal, the control device may process the second electric signal to obtain and store the frequency and the wavelength of the second surface acoustic wave corresponding to the second electric signal. Alternatively, after receiving the second electric signal, when the first electric signal and the second electric signal need to be processed, the frequency and the wavelength of the first surface acoustic wave corresponding to the first electric signal and the frequency and the wavelength of the second surface acoustic wave corresponding to the second electric signal may be obtained at the same time. A bent state of the surface acoustic wave transmission layer and thus a bent state of the display component may be obtained, by analyzing (e.g., comparing) the frequencies and wavelengths included in the first and second electric signals, i.e., obtaining an amount of change (i.e., a difference) between the frequencies and/or wavelengths. As described above, a pressure distribution and a temperature distribution of the surface acoustic wave transmission layer may be further obtained, thereby obtaining a target area of the display component suitable for display, and driving the target area to display. In addition, in order to obtain a target area, which is suitable for display, of the display component in real time based on the first electric signal and the second electric signal, the control device may, after the wearable display apparatus is powered on, control transmission of the first electric signal and reception of the second electric signal in real time, process the first electric signal and the second electric signal in real time to obtain a target area of the display component suitable for display, and then adjust (or control) the display component to display in the target area in real time.

After the method according to the embodiment of the present disclosure is applied to the wearable display apparatus according to any one of the foregoing embodiments of the present disclosure, the wearable display apparatus may determine a bent state of itself, determine a target area of the display component suitable for display, and display information in the target area, thereby preventing a portion of the display area inconvenient for a user to watch from displaying, and reducing the power consumption while ensuring the user to watch the display area conveniently.

As described above, before controlling the display component to display, the control device may determine a bent state of the display component, to enable determining a target area of the display component suitable for display, facilitating the user to view the display area.

For example, the control device may obtain the frequencies of the first surface acoustic waves based on the first electric signals, obtain the frequencies of the second surface acoustic waves based on the second electric signals, and obtain a frequency distribution of the surface acoustic waves on (e.g., the surface acoustic wave transmission layer of) the wearable display apparatus based on differences between the frequencies of the first surface acoustic waves and the corresponding second surface acoustic waves, such that an initial bent state of the wearable display apparatus (i.e., an initial bent state of the display component) may be determined. The above detection method may be continuously carried out in the whole operating process of the wearable display apparatus, such that the control device may obtain a bent state of the display component in real time, thereby determining a target area, which is suitable for display, of the display component in real time, facilitating the user to view the display area.

In an embodiment, the step that the first electric signal and the second electric signal are processed, by the control device, to obtain a target area of the display component suitable for display may be as follows.

The control device obtains a wavelength of the first surface acoustic wave based on the first electric signal and obtains a wavelength of the second surface acoustic wave based on the second electric signal, so as to obtain a wavelength distribution, obtains a distribution of pressures (i.e., the pressure distribution) applied to the surface acoustic wave transmission layer, obtains a target area of the display component suitable for display according to the wavelength distribution and the distribution of pressures, and controls the target area to perform a display function. For example, a method for obtaining the distribution of the pressures applied to the surface acoustic wave transmission layer according to a difference between wavelengths of the surface acoustic waves may be a curve fitting method or other methods known in the art. Further, as described above, the distribution of pressures may be obtained by the matrix formed by the surface acoustic wave transmission devices 221 having the functions of pressure sensors.

Further, the pressure distribution may be a uniform distribution or a non-uniform distribution. In the uniform distribution, the control device may control the entire of the display area of the display component to display or not to display. In the non-uniform distribution, the control device may control the target area of the display component to perform a display function.

For example, the uniform distribution means that positions (e.g., the positions where the surface acoustic wave transmission devices 221 having the functions of pressure sensors are located) of the entire surface acoustic wave transmission layer are subjected to a same pressure. The non-uniform distribution means that a pressure applied to a portion of the surface acoustic wave transmission layer is large, while a pressure applied to another portion thereof is small.

When it is determined that the pressure distribution of the surface acoustic wave transmission layer is a uniform distribution (e.g., a uniform pressure), a further determination may be made as to a relationship between the uniform pressure and a preset pressure, where the uniform pressure may be referred to as a first pressure. For example, the preset pressure may be the weight of the wearable display apparatus itself. When the first pressure is equal to the preset pressure, it may be determined that the entire surface acoustic wave transmission layer is in contact with an object or a support surface without being subjected to extra extrusion, and in this case, a part or the entire of the display area of the display component may be controlled to display. When the first pressure is smaller than the preset pressure, it may be determined that the entire surface acoustic wave transmission layer is not in contact with the object or the support surface, i.e., the surface acoustic wave transmission layer is in a state of suspending in the air, and in this case, the entire of the display area of the display component may be controlled to not display.

When the pressure distribution of the surface acoustic wave transmission layer is determined to be a non-uniform distribution (e.g., non-uniform pressure), a further determination may be made. That is, a relationship between the non-uniform pressure and a preset pressure is determined, where the non-uniform pressure may be referred to as a second pressure. When the second pressure applied to one or more regions of the surface acoustic wave transmission layer is equal to the preset pressure, it may be determined that the region(s) of the surface acoustic wave transmission layer is/are in contact with an object or a support surface, or that the surface acoustic wave transmission layer is in contact with a part of a user wearing the display apparatus, and an area of the display component corresponding to the region(s) may be determined to be a target area suitable for watching. Then, the target area of the display component may be controlled to display. When the second pressure applied to one or more regions of the surface acoustic wave transmission layer is smaller than the preset pressure, it may be determined that the region(s) of the surface acoustic wave transmission layer is/are not in contact with the object or the support surface and thus, in a state of suspending in the air. For example, the wearable display apparatus may be bent and worn on an arm of the user, and the area below the arm when the arm is raised up may be determined to be an area unsuitable for display (i.e., the area above the arm when the arm is raised up may be determined to be the target area suitable for display). When the second pressure applied to one or more regions of the surface acoustic wave transmission layer is much greater than the preset pressure, it may be determined that the region(s) of the surface acoustic wave transmission layer is/are in contact with the object or the support surface and is/are subjected to additional extrusion. For example, the wearable display apparatus may be bent and worn on an arm of the user, and the arm of the user may press a portion of the wearable display apparatus between the arm and a surface of a table. In this case, the area located below the arm may be determined to be an area unsuitable for display (i.e., an area located above the arm is a target area suitable for display).

In an embodiment, the step that the first electric signal and the second electric signal are processed, by the control device, to obtain a target area of the display component suitable for display may include the following steps.

The control device obtains the wavelength of the first surface acoustic wave based on the first electric signal and obtains the wavelength of the second surface acoustic wave based on the second electric signal so as to obtain a wavelength distribution, obtains a temperature distribution of the surface acoustic wave transmission layer, obtains a target area of the display component suitable for display according to the wavelength distribution and the temperature distribution, and controls the target area to perform a display function. For example, a method for obtaining the temperature distribution of the surface acoustic wave transmission layer according to a change in the wavelength of the surface acoustic wave may be a curve fitting method or other methods known in the art. Further, as described above, the temperature distribution may be obtained by the matrix formed by the surface acoustic wave transmission devices 221 having the functions of temperature sensors.

For example, a method for determining a target area suitable for display by determining a temperature distribution of the surface acoustic wave transmission layer may be combined with a method for determining a target area suitable for display by determining a pressure distribution of the surface acoustic wave transmission layer, or may be employed separately.

For example, when a user wears the wearable display apparatus according to any one of the foregoing embodiments of the present disclosure, the surface acoustic wave transmission layer of the wearable display apparatus and a part of the user wearing the display apparatus may have two positional relationships, one is with contact with each other and the other is without contact (i.e., non-contact) with each other. When the wearable display apparatus is worn around the arm of the user and the user raises the arm up to watch the information displayed on the display component, a temperature of a region of the surface acoustic wave transmission layer in contact with the arm may be equal to a temperature of the arm of the user, and an area of the display component corresponding to the region may be determined as a target area suitable for display, while the rest of the display area of the display component is an area unsuitable for display. In a case where this method is combined with a method for determining a target area suitable for display by determining a pressure distribution of the surface acoustic wave transmission layer, when an arm of the user contacts a region of the surface acoustic wave transmission layer and applies pressure to the region (i.e., the region is pressed against a surface of a table), although a temperature of the region may be equal to the temperature of the arm of the user, the pressure applied to the region will be much greater than the preset pressure, such that an area corresponding to the region may be determined as an area unsuitable for display. In this case, an area of the display component corresponding to a region of the surface acoustic wave transmission layer subjected to a pressure equal to the preset pressure (i.e., an area of the display component corresponding to a region of the surface acoustic wave transmission layer opposite to the region pressed by the user's arm against the surface of the table) may be determined as a target area suitable for display.

The above-described embodiments may be combined with each other in the case of no explicit conflict.

The wearable display apparatus and the display control method thereof according to the above embodiments of the present disclosure have at least the following advantages.

In the wearable display apparatus according to any one of the foregoing embodiments of the present disclosure, the display component is provided on a first surface of the substrate of the wearable display apparatus, the surface acoustic wave transmission layer is provided on the second surface opposite to the first surface on which the display component is provided, and at least one surface acoustic wave input transducer and at least one surface acoustic wave output transducer are provided on the surface acoustic wave transmission layer and close to edges of the substrate to be adjacent to and spaced apart from each other. As such, the wearable display apparatus may drive the surface acoustic wave input transducer to send out the first surface acoustic wave under the control of the first electric signal output from the control device of the wearable display apparatus. The first surface acoustic wave may be transmitted on the surface acoustic wave transmission layer, and may undergo a change in frequency and a change in wavelength, depending on a bent state of the surface acoustic wave transmission layer (i.e., a bent state of the wearable display apparatus), pressures applied to the surface acoustic wave transmission layer, and temperatures of the surface acoustic wave transmission layer, to become the second surface acoustic wave. Then, the surface acoustic wave output transducer receives the second surface acoustic wave and then sends the second electric signal to the control device. At this time, the control device may obtain a bent state of the wearable display apparatus and determine a target area, which is suitable for display, of the display component of the wearable display apparatus, based on the first electric signal and the second electric signal, and thereby drive the target area to display. Therefore, the wearable display apparatus according to any one of the foregoing embodiments of the present disclosure may determine the bent state of itself, determine the target area of the display component suitable for display, and drive the target area to display information. As a result, a portion of the display area that is inconvenient for a user to view is prevented from displaying, and the power consumption is reduced while facilitating the user to view the display area.

The foregoing embodiments are merely exemplary embodiments of the present disclosure, and are not intended to limit the present disclosure in any way. Any simple modifications, equivalent variations or alterations made to the foregoing embodiments, based on the technical essence of the present disclosure, should be considered as falling within the scope of the present disclosure as defined by the appended claims.

What is claimed is:

1. A wearable display apparatus, comprising:
   a substrate;
   a display component on a first surface of the substrate;
   a surface acoustic wave transmission layer on a second surface of the substrate opposite to the first surface;
   at least one surface acoustic wave input transducer on the surface acoustic wave transmission layer and along a first direction, at an edge of the substrate, and configured to send out a first surface acoustic wave;
   at least one surface acoustic wave output transducer on the surface acoustic wave transmission layer and along a second direction crossing the first direction, the at least one surface acoustic wave output transducer being in one-to-one correspondence with the at least one surface acoustic wave input transducer, each surface acoustic wave output transducer and a corresponding surface acoustic wave input transducer being at an edge of the substrate to be adjacent to and spaced apart from each other, and each surface acoustic wave output transducer being configured to receive a second surface acoustic wave resulted from the first surface acoustic wave being transmitted and modulated by the surface acoustic wave transmission layer; and
   a control device, configured to send a first electric signal to the at least one surface acoustic wave input transducer to control the at least one surface acoustic wave input transducer to send out the first surface acoustic wave, and configured to receive a second electric signal output from the at least one surface acoustic wave output transducer, and control a target area of the display component to display based on the first electric signal and the second electric signal.

2. The wearable display apparatus according to claim 1, wherein
   the surface acoustic wave transmission layer comprises a piezoelectric film and a surface acoustic wave transmission device layer that are sequentially stacked on the second surface of the substrate; and
   both the at least one surface acoustic wave input transducer and the at least one surface acoustic wave output transducer are on the piezoelectric film.

3. The wearable display apparatus according to claim 2, wherein
   the surface acoustic wave transmission device layer comprises a plurality of surface acoustic wave transmission devices that are spaced apart from each other and distributed on the piezoelectric film in a matrix; and
   the plurality of surface acoustic wave transmission devices are configured to transmit surface acoustic waves with different wavelengths.

4. The wearable display apparatus according to claim 3, wherein
   each of the plurality of surface acoustic wave transmission devices comprises a plurality of interdigital transduction transmission subunits, each of the plurality of interdigital transduction transmission subunits comprises two antennas, one interdigital transducer and one reflective grating, the two antennas are connected to two sides of a first end of the interdigital transducer, respectively, and the reflective grating is at a second end of the interdigital transducer opposite to the first end and is spaced apart from the second end; and
   the plurality of interdigital transduction transmission subunits are around a same position, and the antennas at first ends of interdigital transducers are sequentially connected to each other to form a polygon.

5. The wearable display apparatus according to claim 4, wherein
   the reflecting grating of each interdigital transduction transmission subunit of the plurality of interdigital transduction transmission subunits is an encoded reflective grating, the encoded reflective grating has a code indicating a physical position of the encoded reflective grating on the surface acoustic wave transmission layer, and the surface acoustic wave transmitted by the interdigital transduction transmission subunit comprises the code.

6. The wearable display apparatus according to claim 4, wherein
   the plurality of surface acoustic wave transmission devices comprise surface acoustic wave transmission devices having a function of a pressure sensor and surface acoustic wave transmission devices having a function of a temperature sensor, the surface acoustic wave transmission devices having a function of a pressure sensor form a first sub-matrix, and the surface acoustic wave transmission devices having a function of a temperature sensor form a second sub-matrix.

7. The wearable display apparatus according to claim 6, wherein
   each surface acoustic wave transmission device having a function of a pressure sensor comprises a pressure sensitive material layer between the plurality of interdigital transduction transmission subunits of the surface acoustic wave transmission device having a function of a pressure sensor and the piezoelectric film, and each surface acoustic wave transmission device having a function of a temperature sensor comprises a temperature sensitive material layer between the plurality of interdigital transduction transmission subunits of the surface acoustic wave transmission device having a function of a temperature sensor and the piezoelectric film.

8. The wearable display apparatus according to claim 6, wherein
each surface acoustic wave transmission device having a function of a pressure sensor comprises a pressure sensor in the polygon formed by the antennas of the plurality of interdigital transduction transmission subunits of the surface acoustic wave transmission device having a function of a pressure sensor, and each surface acoustic wave transmission device having a function of a temperature sensor comprises a temperature sensor in the polygon formed by the antennas of the plurality of interdigital transduction transmission subunits of the surface acoustic wave transmission device having a function of a temperature sensor.

9. The wearable display apparatus according to claim 6, wherein
columns of the first sub-matrix and columns of the second sub-matrix are arranged alternately.

10. The wearable display apparatus according to claim 9, wherein
rows of the first sub-matrix and rows of the second sub-matrix are arranged alternately.

11. The wearable display apparatus according to claim 4, wherein
a length of each interdigital transducer is equal to 10 times of a wavelength of the surface acoustic wave transmitted by the interdigital transducer;
a distance between any two adjacent fingers of the interdigital transducer is equal to ½ of the wavelength of the surface acoustic wave transmitted by the interdigital transducer;
a width of each finger of the interdigital transducer is equal to ¼ of the wavelength of the surface acoustic wave transmitted by the interdigital transducer; and
an interdigital aperture of the interdigital transducer is 2 mm to 4 mm.

12. The wearable display apparatus according to claim 1, wherein
the at least one surface acoustic wave input transducer comprises a plurality of surface acoustic wave input transducers, which are substantially uniformly distributed on a periphery of the substrate; and
the at least one surface acoustic wave output transducer comprises a plurality of surface acoustic wave output transducers, which are on the periphery of substrate to be respectively adjacent to and spaced apart from the plurality of surface acoustic wave input transducers.

13. The wearable display apparatus according to claim 12, wherein
the substrate is a rectangle;
the plurality of surface acoustic wave input transducers comprise four surface acoustic wave input transducers, which are at four corners of the substrate, respectively; and
the plurality of surface acoustic wave output transducers comprise four surface acoustic wave output transducers, which are at the four corners of the substrate to be adjacent to and spaced apart from the plurality of surface acoustic wave input transducers, respectively.

14. The wearable display apparatus according to claim 1, wherein
the substrate is a flexible substrate, and the display component is a flexible display component.

15. A display control method of a wearable display apparatus, the wearable display apparatus being the wearable display apparatus according to claim 1, the display control method comprising:

sending the first electric signal, by the control device, to the at least one surface acoustic wave input transducer to control the at least one surface acoustic wave input transducer to send out the first surface acoustic wave;
receiving the second electric signal, by the control device, from the at least one surface acoustic wave output transducer; and
processing the first electric signal and the second electric signal by the control device to obtain a target area of the display component suitable for display, and controlling the target area, by the control device, to perform a display function;
wherein the second electric signal is converted from the second surface acoustic wave by the at least one surface acoustic wave output transducer, and the second surface acoustic wave is resulted from the first surface acoustic wave being transmitted and modulated by the surface acoustic wave transmission layer.

16. The display control method according to claim 15, wherein
the control device obtains a frequency of the first surface acoustic wave based on the first electric signal, obtains a frequency of the second surface acoustic wave based on the second electric signal, and obtains an initial bent state of the wearable display apparatus based on the frequency of the first surface acoustic wave and the frequency of the second surface acoustic wave.

17. The display control method according to claim 15, wherein
the at least one surface acoustic wave input transducer comprises a plurality of surface acoustic wave input transducers, and the at least one surface acoustic wave output transducer comprises a plurality of surface acoustic wave output transducers;
the first electric signal is configured to control the plurality of surface acoustic wave input transducers to send out first surface acoustic waves with a same frequency and different wavelengths; and
second electric signals are converted from second surface acoustic waves having different wavelengths, respectively.

18. The display control method according to claim 15, wherein the processing the first electric signal and the second electric signal by the control device to obtain a target area of the display component suitable for display comprises:
obtaining, by the control device, a wavelength of the first surface acoustic wave based on the first electric signal, and obtaining, by the control device, a wavelength of the second surface acoustic wave based on the second electric signal, so as to obtain a wavelength distribution, obtaining, by the control device, a distribution of pressures applied to the surface acoustic wave transmission layer, and obtaining, by the control device, the target area of the display component suitable for display according to the wavelength distribution and the distribution of pressures.

19. The display control method according to claim 18, wherein
the distribution of pressures comprises a uniform distribution and a non-uniform distribution;
the control device controls the display component to display or not display in its entirety in a case of the uniform distribution; and
the control device controls the target area of the display component to perform a display function in a case of the non-uniform distribution.

20. The display control method according to claim 15, wherein the processing the first electric signal and the second electric signal by the control device to obtain a target area of the display component suitable for display comprises:
  obtaining, by the control device, a wavelength of the first surface acoustic wave based on the first electric signal, and obtaining, by the control device, a wavelength of the second surface acoustic wave based on the second electric signal, so as to obtain a wavelength distribution, obtaining, by the control device, a distribution of temperatures of the surface acoustic wave transmission layer, and obtaining, by the control device, the target area of the display component suitable for display according to the wavelength distribution and the distribution of temperatures.

\* \* \* \* \*